United States Patent
Hall et al.

(10) Patent No.: US 9,883,252 B2
(45) Date of Patent: Jan. 30, 2018

(54) METHOD AND SYSTEM FOR AUTOMATICALLY GENERATING INTERSTITIAL MATERIAL RELATED TO VIDEO CONTENT

(71) Applicant: Cisco Technology, Inc., San Jose, CA (US)

(72) Inventors: Nicholas Ashton Hall, Walton-on-Thames (GB); Stephen Tallamy, Sandhurst (GB); Avraham Poupko, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 14/413,244

(22) PCT Filed: Jul. 9, 2013

(86) PCT No.: PCT/IB2013/055620
§ 371 (c)(1),
(2) Date: Jan. 7, 2015

(87) PCT Pub. No.: WO2014/009873
PCT Pub. Date: Jan. 16, 2014

(65) Prior Publication Data
US 2015/0143413 A1  May 21, 2015

(30) Foreign Application Priority Data
Jul. 9, 2012  (GB) .................................. 1212152.1

(51) Int. Cl.
*H04N 7/10* (2006.01)
*H04N 7/025* (2006.01)
(Continued)

(52) U.S. Cl.
CPC ....... *H04N 21/812* (2013.01); *G06F 17/2785* (2013.01); *G06F 17/289* (2013.01);
(Continued)

(58) Field of Classification Search
CPC .............. H04N 21/251; H04N 21/252; H04N 21/25866; H04N 21/25883;
(Continued)

(56) References Cited

U.S. PATENT DOCUMENTS

| 6,199,076 B1 | 3/2001 | Logan et al. |
| 6,591,292 B1 * | 7/2003 | Morrison ........... H04N 21/4786 725/22 |

(Continued)

FOREIGN PATENT DOCUMENTS

| WO | WO 2001/77776 | 10/2001 |
| WO | WO 2004/023437 | 3/2004 |
| WO | WO 2011/100206 | 8/2011 |

OTHER PUBLICATIONS

GB Combined Search and Examination Report, Nov. 22, 2012.
(Continued)

*Primary Examiner* — Jeremy Duffield
(74) *Attorney, Agent, or Firm* — Samuel M. Katz

(57) ABSTRACT

A method implementable on a computing device for generating interstitial material for video content includes generating at least one instantiated script by inserting metadata related to the video content into at least one script template, scoring the instantiated scripts according to a predefined set of weights associated with a profile for a viewing audience to produce scored scripts, and selecting from said scored scripts according to at least said scoring for rendering as said interstitial material. Related apparatus and methods are also described.

30 Claims, 11 Drawing Sheets

(51) Int. Cl.
| | |
|---|---|
| H04N 21/81 | (2011.01) |
| H04N 21/258 | (2011.01) |
| H04N 21/235 | (2011.01) |
| H04N 21/25 | (2011.01) |
| H04N 21/466 | (2011.01) |
| H04N 21/234 | (2011.01) |
| G10L 13/08 | (2013.01) |
| G06Q 30/02 | (2012.01) |
| H04N 21/8543 | (2011.01) |
| G06F 17/27 | (2006.01) |
| G06F 17/28 | (2006.01) |
| H04N 21/85 | (2011.01) |

(52) U.S. Cl.
CPC ..... *G06Q 30/0271* (2013.01); *G06Q 30/0276* (2013.01); *G10L 13/08* (2013.01); *H04N 21/2358* (2013.01); *H04N 21/23424* (2013.01); *H04N 21/252* (2013.01); *H04N 21/25833* (2013.01); *H04N 21/25866* (2013.01); *H04N 21/4667* (2013.01); *H04N 21/4668* (2013.01); *H04N 21/85* (2013.01); *H04N 21/8543* (2013.01)

(58) Field of Classification Search
CPC ......... H04N 21/25891; H04N 21/4662; H04N 21/4667; H04N 21/812; H04N 21/23424; H04N 21/2358
USPC .................................................. 725/9, 32–36
See application file for complete search history.

(56) References Cited

U.S. PATENT DOCUMENTS

| | | | |
|---|---|---|---|
| 6,792,615 B1 | 9/2004 | Rowe et al. | |
| 7,870,023 B2* | 1/2011 | Ozer | G06Q 30/02 725/32 |
| 2002/0138834 A1* | 9/2002 | Gerba | H04N 21/812 725/42 |
| 2002/0147645 A1* | 10/2002 | Alao | H04N 21/2343 705/14.54 |
| 2004/0243623 A1* | 12/2004 | Ozer | G06Q 30/02 |
| 2006/0090182 A1* | 4/2006 | Horowitz | H04N 21/47815 725/40 |
| 2007/0157228 A1* | 7/2007 | Bayer | H04N 21/466 725/34 |
| 2007/0260460 A1 | 11/2007 | Hyatt | |
| 2008/0295130 A1* | 11/2008 | Worthen | H04N 21/2743 725/34 |
| 2010/0094531 A1 | 4/2010 | Macleod | |
| 2010/0122285 A1 | 5/2010 | Begeja et al. | |
| 2011/0078726 A1* | 3/2011 | Rosenberg | H04N 21/23424 725/34 |
| 2011/0197220 A1* | 8/2011 | Rowe | H04N 21/25883 725/32 |
| 2011/0307551 A1* | 12/2011 | Danezis | G06F 17/30522 709/204 |

OTHER PUBLICATIONS

International Search Report, Feb. 24, 2014.
Wikipedia, Continuity (Broadasting) can be found at: http://en.wikipedia.org/wiki/Continuity_announcer.
Wikipedia, Bumper (Broadcasting) can be found at: http://en.wikipedia.org/wiki/Bumper_(broadcasting).
Wikipedia, Content Determination can be found at: http://en.wikipedia.org/wiki/Content_determination.
Wikipedia, Natural Language Generation can be found at: http://en.wikipedia.org/wiki/Natural_language_generation.
Wikipedia, Speech Synthesis can be found at: http://en.wikipedia.org/wiki/Speech_synthesis.
Partial Search Report, dated Nov. 29, 2013.

* cited by examiner

Examples of Program Metadata:

☐ Title (including series and episode titles)
☐ Synopsis
☐ Genre(s)
☐ Keywords
☐ Themes, tones and moods
☐ Cast and Crew (regular and guest stars) including detection of an ensemble
☐ Awards (including relation to cast) including detection that a majority of leading cast members are award winners and so form an "all-star" cast
☐ Awards (including relation to cast)
☐ Year of production
☐ Filming locations
☐ Parental advisories and other guidance
☐ Season and episode numbers
☐ Content type (TV special, episode, movie)
☐ Franchise information including information such as prequel/sequel/spin-off
☐ Video format (HD, SD, 3D)
☐ Subtitle and alternative audio track availability
☐ Content producer/studio
☐ Related material such as book, theatrical play, musical
☐ Sports teams

FIG. 3A

Examples of Scheduling Metadata:

▢ Date and time of play out
▢ Duration of event
▢ Channel
▢ Premiere or repeat
▢ Exclusivity
▢ Availability of alternative showings (different video format/different time/on demand)
▢ Events that precede or follow this event in schedule on this channel and related channels

FIG. 3B

Examples of External source Metadata:

▢ Popularity of the program
▢ Popularity of cast and crew
▢ Filmography of cast and crew
▢ Sports results (e.g. league tables, upcoming and previous fixtures, recent results)
▢ Information about the viewing user including viewing history/preferences

Template: "Now on [channel name], the [year of production] [genre] [title] starring [cast member] and [cast member]."

115A

Example: "Now on BBC1, the 2001 romantic comedy 'Serendipity' starring John Cusack and Kate Beckinsale." ~116

112B

Template: "[popular guest cast] guest stars in the [season premiere, season finale, very last episode] of [title], exclusively on [channel name]."

115B

Example: "Jennifer Aniston guest stars in the season premiere of 'Cougar Town', exclusively on Sky1".

112C

Template: "The [award] winning [cast member] returns in [his/her] role as [character name] in the [stemmed genre] [title]. This program contains [advisory]."

115C

Example: "The Oscar winning Anthony Hopkins returns in his role as Hannibal Lector in the thrilling 'Red Dragon'. This program contains violence and some strong language".

112D

Template: "[time of day]'s [genre] is [popular director]'s directorial debut [title] starring [cast] as [character]. Also available in [HD, 3D] on [alternative channel]."

115D

Example: "Tonight's action-comedy is Michael Bay's directorial debut 'Bad Boys' starring Will Smith as Detective Mike Lowrey. Also available in HD on ITV1 HD".

112E

Template: "From the creators of [title of popular program by creator], [actor] stars in the new [genre] [title]."

115E

Example: "From the creators of Friends, Matt LeBlanc stars in the new comedy 'Episodes'."

Template: "Don't miss the next episode of [title] at [time] on [day], here on [channel name]. Previous episodes are available for [num days] day on [catch-up service]. Stay tuned for a brand new episode of [next title]".

115F

Example: "Don't miss the next episode of 'Waterloo Road' at 7:30 on Monday, here on BBC1. Previous episodes are available for 7 days on BBC iPlayer. Stay tuned for a brand new episode of 'Planet Dinosaur'".

112G

Template: "Next on [channel name] catch the [decade of production] classic [title]. Later watch [cast] in the [genre] [title], starting at [time]. Starting on [associated channel] now, the new series of [title]".

115G

Example: "Next on Film 4 catch the 1980s classic 'Terminator'. Later watch Brendan Fraser in the teen comedy 'Encino Man', starting at 10:30. Starting on Channel 4 now, the new series of 'The Inbetweeners'".

FIG. 4B

| Attribute | Value |
|---|---|
| Title | Sense and Sensibility |
| Content Type | Movie |
| Genres | Drama<br>Comedy<br>Romance |
| Cast | Emma Thompson as Elinor Dashwood<br>Hugh Grant as Edward Ferrars<br>Kate Winslet as Marianne Dashwood<br>Alan Rickman as Colonel Christopher Brandon<br>Greg Wise as John Willoughby<br>Gemma Jones as Mrs. Dashwood<br>Emilie François as Margaret Dashwood<br>James Fleet as John Dashwood |
| Director | Ang Lee |
| Release date | 13th December 1995 |
| Awards won | Golden Globe Award for Best Drama Film<br>Academy Award for Writing Adapted Screenplay<br>BAFTA Award for Best Actress in a Leading Role<br>BAFTA Award for Best Actress in a Supporting Role<br>BAFTA Award for Best Film<br>Golden Globe Award for Best Screenplay - Motion Picture |
| Adapted from | "Sense and Sensibility" by Jane Austen |
| Cast awards | Emma Thompson – Academy Awards, Golden Globe Awards, BAFTA awards<br>Hugh Grant – Golden Globe Award, BAFTA award<br>Kate Winslet – Academy Award, Gold Globe Awards, BAFTA Award |
| Director's other directing credits | Brokeback Mountain<br>Crouching Tiger, Hidden Dragon<br>Eat Drink Man Woman<br>Hulk |
| Channel | BBC1/BCC1 HD |
| Broadcast time | 8pm |

FIG. 5

*Template 1:*

"Now on [channel name], the [year of production] [genre] [title] starring [cast member] and [cast member]."

*Instantiated:*

Script 1a:
"Now on BBC1, the 1995 drama 'Sense and Sensibility' starring Emma Thompson and Hugh Grant.

Script 1b:
"Now on BBC1, the 1995 drama 'Sense and Sensibility' starring Emma Thompson and Kate Winslet.

Script 1c:
"Now on BBC1, the 1995 drama 'Sense and Sensibility' starring Hugh Grant and Kate Winslet.

---

*Template 2:*

"Stay with us on [channel name] - the [award] winning [genre] [title] is next."

*Instantiated:*

Script 2a:
"Stay with us on BBC1 - the Golden Globe winning 'Sense and Sensibility' is next".

Script 2b:
"Stay with us on BBC1 - the BAFTA winning 'Sense and Sensibility' is next".

---

*Template 3:*

"Famous for winning both [award] and [award] awards, [title] is next on [channel name]"

*Instantiated:*

Script 3a:
"Famous for winning both Golden Globe and Oscar awards, 'Sense and Sensibility' is next on BBC1".

Script 3b:
"Famous for winning both Golden Globe and BAFTA awards, 'Sense and Sensibility' is next on BBC1".

FIG. 6A

*Template 4:*

"[popular guest cast] guest stars in the
[season premiere, season finale, very last episode] of [title],
exclusively on [channel name]."

*Instantiated:*

N/A – not an episode

---

*Template 5:*

"The [award] winning [cast member] returns in [his/her] role as
[character name] in the [stemmed genre] [title]. This program contains [advisory]."

*Instantiated:*

N/A – no returning actor or advisory

---

*Template 6:*

"[time of day]'s [genre] is [popular director]'s directorial hit [title] starring [cast] as [character]. Also available in [HD, 3D] on [alternative channel]."

*Instantiated:*

Script 6a
"Tonight's drama is Ang Lee's directorial hit 'Sense and Sensibility' starring Emma Thompson as Elinor Dashwood. Also available in HD on BBC1 HD".

Script 6b
"Tonight's drama is Ang Lee's directorial hit 'Sense and Sensibility' starring Hugh Grant as Edward Ferrars. Also available in HD on BBC1 HD".

FIG. 6B

*Template 7:*

"Now on [channel name], the [award] award winning [actor] stars in [title]."

*Instantiated:*

Script 7a
"Now on BBC1, the Oscar award winning Emma Thompson stars in 'Sense and Sensibility'."

Script 7b
"Now on BBC1, the Golden Globe award winning Hugh Grant stars in 'Sense and Sensibility'."

Script 7c
"Now on BBC1, the BAFTA award winning Kate Winslet stars in 'Sense and Sensibility'."

*Template 8:*

"From the director of [movie by director], [time of day] [year of production] [genre] is [title]"

*Instantiated:*

Script 8a
"From the director of 'Brokeback Mountain', tonight's 1995 drama is 'Sense and Sensibility'".

Script 8b
"From the director of 'Crouching Tiger, Hidden Dragon', tonight's 1995 drama is 'Sense and Sensibility'".

*Template 9:*

"Adapted from the [author] book and starring [cast], [title] is next on [channel name]."

*Instantiated:*

Script 9a
"Adapted from the Jane Austin book and starring Emma Thompson, 'Sense and Sensibility' is next on BBC1".

FIG. 6C

| Attribute | Importance |
| --- | --- |
| Title | None |
| Content Type | None |
| Genres | Medium |
| Cast | High |
| Cast character | Medium |
| Director | High |
| Release date | Medium |
| Awards won | High |
| Adapted from | Highest |
| Cast awards | Medium |
| Director's other directing credits | Low |
| Channel | Low |
| Broadcast time | Lowest |

FIG. 7

METHOD AND SYSTEM FOR AUTOMATICALLY GENERATING INTERSTITIAL MATERIAL RELATED TO VIDEO CONTENT

The present application is a §371 submission of International Application No. PCT/IB2013/055620, which was filed on Jul. 9, 2013, which was published in the English language on Jan. 16, 2014 with publication number WO 2014/009873. and which claims the benefit of the filing date of GB 1212152.1, filed Jul. 9, 2012.

FIELD OF THE INVENTION

The present invention relates to interstitial assets for channel schedule in general and to generating component voice-over audio in particular.

BACKGROUND OF THE INVENTION

The following references are believed to represent the known state of the art:
en.wikipedia.org/wiki/Continuity_announcer;
en.wikipedia.org/wiki/Bumper_(broadcasting);
en.wikipedia.org/wiki/Natural_language_generation;
en.wikipedia.org/wiki/Content_determination; and
en.wikipedia.org/wiki/Speech_synthesis.

SUMMARY OF THE INVENTION

There is provided, in accordance with some embodiments of the present invention, a method implementable on a computing device for generating interstitial material for video content including generating at least one instantiated script by inserting metadata related to the video content into at least one script template, scoring the at least one instantiated script according to a predefined set of weights associated with a target viewing audience to produce scored scripts, and selecting at least one of the scored scripts to be rendered as the interstitial material, where the selecting is according to at least the scoring.

Further, in accordance with some embodiments of the present invention, the method also includes producing a rendered audio version for each selected scored script.

Still further, in accordance with some embodiments of the present invention, the method also includes mixing each the rendered audio version with at least one other media asset to produce final interstitial content.

Additionally, in accordance with some embodiments of the present invention, the at least one other media asset is at least one video/audio segment from the video content, where the video/audio segment is selected in accordance with video and metadata analysis in order to produce the final interstitial content.

Moreover, in accordance with some embodiments of the present invention, the producing includes validating and correcting grammar in the instantiated scripts.

Further, in accordance with some embodiments of the present invention, the producing includes identifying emphasis points in the instantiated scripts.

Still further, in accordance with some embodiments of the present invention, the generating includes generating different sentence structures based on language and metadata within versions of the instantiated scripts.

Additionally, in accordance with some embodiments of the present invention, the scoring includes weighting at least one of geographic and demographic preferences, where the demographic preferences indicate at least one of gender, age and other sociographic data, and the geographic preferences indicate at least one of national and regional preferences.

Moreover, in accordance with some embodiments of the present invention, the scoring includes weighting viewer preferences, where the viewer preferences are indicated by viewing statistics.

Further, in accordance with some embodiments of the present invention, the scoring includes weighting viewer preferences, where the viewer preferences are indicated by individual viewer profiles.

Still further, in accordance with some embodiments of the present invention, the scoring includes analyzing social graphs to derive preferences from a viewer's relationships with other viewers.

Additionally, in accordance with some embodiments of the present invention, he scoring includes using weighting profiles, where the weighting profiles address specific requirements of at least one of channels, scheduling and other usage characteristics.

Further, in accordance with some embodiments of the present invention, the scoring includes the usage of at least one of popularity, uniqueness and correlation attributes of the program metadata utilized in the script templates being scored.

Additionally, in accordance with some embodiments of the present invention, the method also includes analyzing rendered scripts for comparison against desired interstitial length.

Moreover, in accordance with some embodiments of the present invention, the scoring includes analyzing the instantiated scripts for comparison against desired interstitial length.

Further, in accordance with some embodiments of the present invention, the generating, scoring, selecting and producing are performed by a head-end system.

Still further, in accordance with some embodiments of the present invention, at least one of the generating, scoring, selecting and producing is performed by a client device receiving the video content from a head-end system.

Additionally, in accordance with some embodiments of the present invention, the generating includes indicating a time during the video content for a rendered audio version to be played, where the indicated time is determined in accordance with at least one of the metadata and analysis of the audio and/or video in the video content.

Moreover the method also includes enabling human review and correction of the results of the generating, scoring, rendering and producing.

Further, in accordance with some embodiments of the present invention, the scoring includes: introducing weights based on statistical distributions and template usage history to provide variety in the selecting in order to maximize audience engagement.

Still further, in accordance with some embodiments of the present invention, the method also includes improving the scoring in accordance with analysis of at least one of the human correction of results and viewer response to the interstitial material.

Additionally, in accordance with some embodiments of the present invention, the metadata is at least one of program, program availability, scheduling and externally sourced metadata.

Moreover, in accordance with some embodiments of the present invention, the metadata is associated with a multiplicity of programs.

Further, in accordance with some embodiments of the present invention, the generated scripts are used to form text output.

Still further in accordance with some embodiments of the present invention, the method also includes receiving indications of positive/negative responses to the interstitial material from the target viewing audience, and adjusting the set of weights in accordance with the indications.

Additionally, in accordance with some embodiments of the present invention, the interstitial content is generated as a series of interdependent instances of interstitial content.

Moreover, in accordance with some embodiments of the present invention, the method also includes tracking a history of the interstitial content for the target viewing audience, and adjusting the set of weights in accordance with the history.

There is also provided, in accordance with some embodiments of the present invention, a video content interstitial material generation system including a script template database operative to store script templates, at least one metadata database operative to store metadata associated with media assets, a sentence fragment generator operative to generate instantiated scripts for the media assets by at least inserting the associated metadata into at least one of the script templates, and a sentence fragment scoring engine operative to produce scored scripts by scoring each of the instantiated scripts according to a predefined set of weights.

Further, in accordance with some embodiments of the present invention, the system also includes a rendering manager operative to produce a rendered audio version for selected the scored scripts, where the scored scripts are selected for rendering at least based on scores assigned by the sentence fragment scoring engine.

Still further, in accordance with some embodiments of the present invention, the system also includes an asset mixer operative to mix the rendered audio version with other media assets to produce final interstitial content.

Additionally, in accordance with some embodiments of the present invention, the system also includes a review interface operative to enable human review and control of the operation of the system.

Moreover, in accordance with some embodiments of the present invention, the system also includes means to improve the operation of the sentence fragment scoring engine in accordance with analysis of at least one of manual corrections based on human review and viewer response to the interstitial material.

Further, in accordance with some embodiments of the present invention, the system also includes a grammar validation module operative to validate and correct grammar for the selected scored scripts.

Still further, in accordance with some embodiments of the present invention, the system also includes a prosody & emotional control module operative to modify the scored scripts to reflect relative importance as indicated by the associated metadata and the script template.

BRIEF DESCRIPTION OF THE DRAWINGS

The present invention will be understood and appreciated more fully from the following detailed description, taken in conjunction with the drawings in which:

FIGS. 3A-C sample listings types of metadata available to an operator of the system of FIG. 1;

FIGS. 4A and 4B are illustrations of a series of exemplary templates and associated instantiated scripts that useful in understanding the embodiments of FIGS. 1 and 2; and FIGS. 5, 6A-6C and 7 are illustrations of sample templates, available content and scheduling metadata used to illustrate the scoring process for an exemplary embodiment of the present invention.

DETAILED DESCRIPTION

In the following description, for purposes of explanation, numerous details are set forth, such as flowcharts and systems configuration, in order to provide an understanding of one or more embodiments of the present invention, However it is and will be apparent to one skilled in the art that those specific details are not required in order to practice the present invention.

Television (TV) audiences typically consume content as a linear TV experience. Interstitial content may often form part of the viewing experience via a channel schedule or playlist of programs. Such interstitial content may include, for example, advertising, sponsorship, channel branding as well as upcoming program introductions and promotions. This interstitial content may also typically include a scripted audio voice-over, either pre-recorded or spoken live by a continuity announcer. These announcements, together with their related video, may be intended to promote viewer empathy and retain the audience across program junctions and advertising breaks.

Internet-based (over-the-top) content delivery may now provide the means to create and deliver niche channels to audiences at a lower cost than before. Niche broadcasters may rely heavily on the creation of effective interstitial content to build a channel brand, particularly as they often do not have the resources for more aggressive brand marketing. However, while video and image asset creation may be accomplished using free or commercial, off-the-shelf desktop tools, voice-over generation has traditionally relied on pre-recorded or live voice talent, which may typically be more expensive and/or resource intensive.

Figure 1:
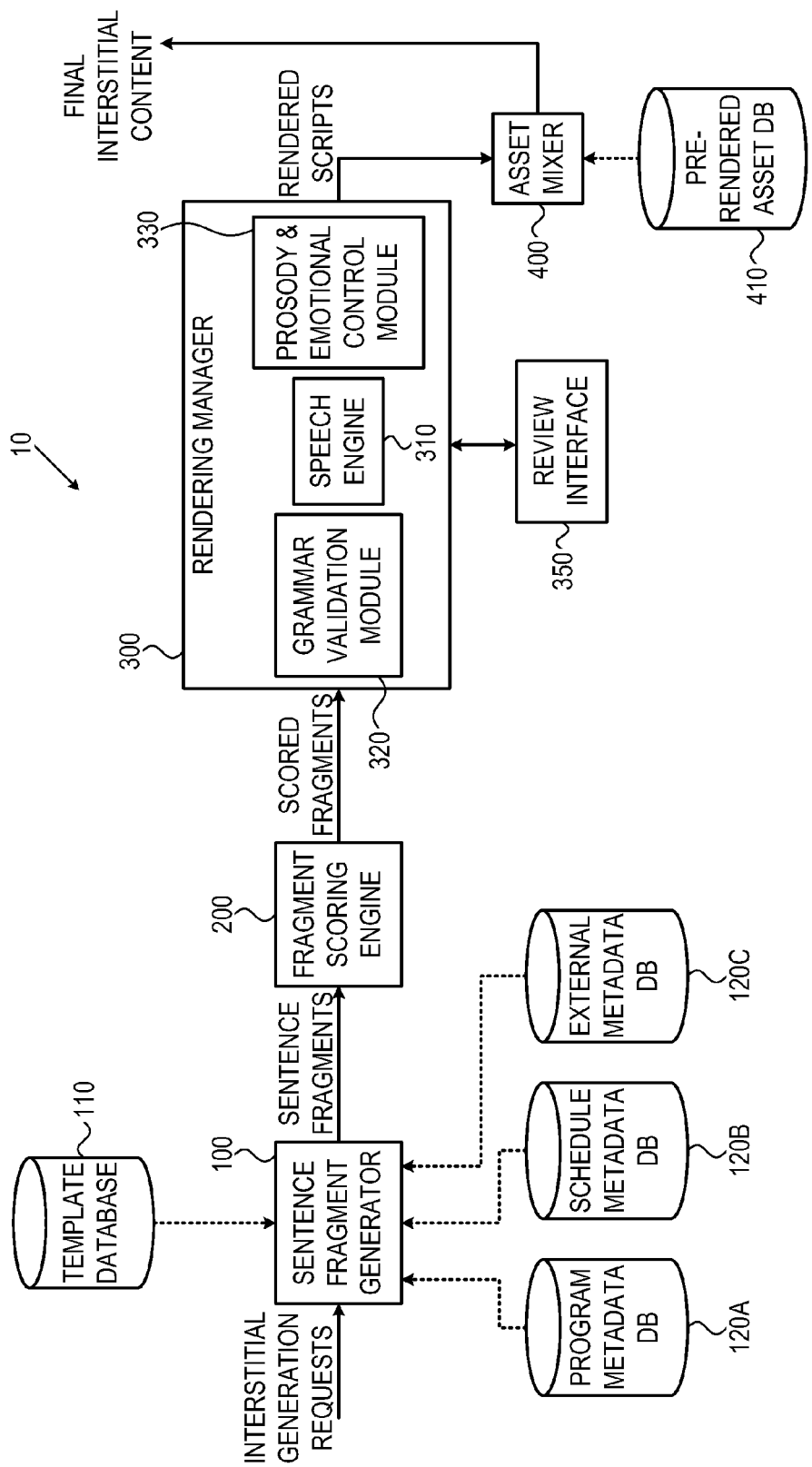
FIG. 1 is a schematic illustration of a novel interstitial content generation system, constructed and operative in accordance with an embodiment of the present invention.

Applicant has realized that a system for the automated generation and synthesis of voice-over continuity scripts may provide a cost effective solution to such niche broadcasters as well as to traditional broadcasters that may otherwise rely on pre-recorded or live voice talent when generating interstitial content. FIG. 1, to which reference is now made, illustrates a novel interstitial content generation system 10, operative and constructed in accordance with an embodiment of the present invention. System 10 may facilitate the automated creation of continuity announcement scripts which, in turn, would be rendered by natural speech synthesis engines to be mixed with other video and audio material in order to create final interstitial assets for insertion into a program schedule or playlist. It will be appreciated that system 10 may be implemented on any suitable computing device or group of computing devices, such as are known in the art.

System 10 may comprise sentence fragment generator 100, fragment scoring engine 200, rendering manager 300 and asset mixer 400. As will be described herein below, sentence fragment generator 100 may access template database 110 and metadata databases 120 to generate a multiplicity of "candidate" sentence fragments which may be scored by fragment scoring engine 200. Rendering manager 300 may create synthesized voice-over recordings to render audio scripts for sentence fragments with high scores. Asset mixer 400 may mix the rendered scripts with material from pre-rendered assets database 410 to produce final interstitial content.

Figure 2:
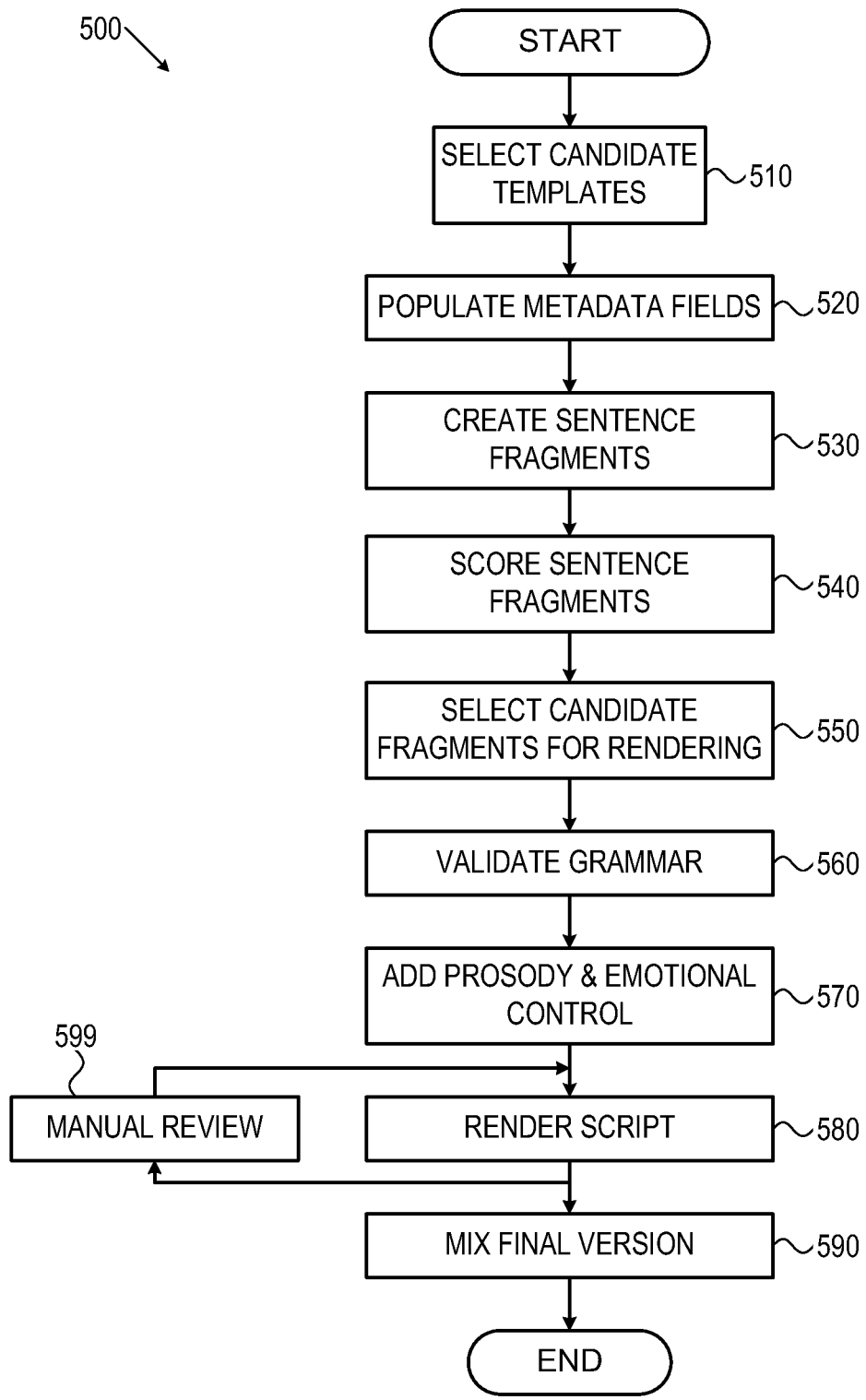
FIG. 2 is a block diagram of a novel interstitial content generation process that may be used by the system of FIG. 1.

Reference is now made to FIG. 2 which illustrates a novel interstitial content generation process 500 that may be used by system 10 to generate interstitial content. Sentence fragment generator 100 may select (step 510) one or more templates from template database 110 and populate them with metadata from metadata databases 120 to create (step 530) candidate sentence fragments that may, as will be described herein below, later be assembled into finished interstitial content.

System 10 may leverage various types of related metadata that may be available to a broadcaster. For example, while performing step 520, sentence fragment generator 110 may access program metadata database 120A for program metadata, scheduler metadata database 120B for scheduling metadata, and external metadata database 120C for externally sourced metadata. FIG. 3A-3C, to which reference is now made, may provide sample listings of each of these types of metadata. It will be appreciated that these sample listings are representative and not exhaustive listings of each type of metadata. System 10 may also be configured to use other types of metadata, for example, program availability metadata for "video on demand" (VOD) offerings. Furthermore, the depiction of separate databases 120 for each type of metadata may be exemplary; the present invention may support other configurations for storing and/or retrieving such information. Similarly, in some implementations of the present invention step 520 may employ only one or two types of metadata.

The templates may represent a structured sentence or paragraph with "placeholders" for which the metadata may be substituted. Substitution of metadata may be simple inline word replacement or involve grammatical extensions such as stemming. FIGS. 4A and 4B, to which reference is now made, illustrate a series of exemplary templates 112 and associated instantiated scripts 115 as may be populated by sentence fragment generator 100 with metadata from metadata databases 120.

Each template 112 may comprise insertion fields 113 to be filled in with metadata from one or more metadata databases 120. For example, template 112A may have six insertion fields 113: "channel name", "year of production", "genre", "title", "cast member" and "cast member". Instantiated script 115A may represent a sentence fragment generated from template 112A, with inserted metadata 116 replacing insertion fields 113. Sentence fragment generator 100 may retrieve schedule-related metadata such as "channel name" from scheduler metadata database 120B. The remaining insertion fields 113 in template 112A may be associated with program metadata; sentence fragment generator 100 may insert values for them from program metadata database 120B.

It will be appreciated that each template 112 may comprise one or more insertion fields 113 with a similar number of inserted metadata 116. However, in the interests of clarity, most of insertion fields 113 and inserted metadata 116 may not have been labelled as such in FIGS. 4A and 4B. It will be appreciated, however, insertion fields 113 may be indicated by bracketed field descriptions with bold fonts such as, for example, "[popular guest cast]" in template 112B. Inserted metadata 116 may be indicated by underlined text with bold fonts such as, for example, "Jennifer Aniston" in instantiated script 115B.

It will also be appreciated that templates 112 may be defined for interstitial content appropriate for any point in a broadcaster's schedule. For example, templates 112 as depicted in FIG. 4A may be used to generate interstitial scripts that may precede a program, different templates 112 may be created to generate interstitial content that may be played over the end credits of a program or as stand-alone promotional interstitial to promote upcoming programs. Templates 112F and 112G in FIG. 4B may represent examples of templates 112 that may be used to produce such interstitial content.

It will also be appreciated that templates 112 as depicted in FIGS. 4A and 4B may be exemplary; system 10 may support the creation of an unlimited number of templates 112. Some templates 112 may be used generically to create standard interstitial content for all programs and/or channels. Some templates 112 may be limited for use with specific programs and/or specific channels and/or any other scheduling attributes.

Templates 112 may be also extended beyond a basic script with word substitutions to an ordered set of sentence fragments that can be combined to generate different length interstitials. Sentence fragment generator 100 may also produce multiple sentence fragments for each desired interstitial script. Returning to FIGS. 1 and 2, fragment scoring engine 200 may score (step 540) each such sentence fragment based on a set of configurable criteria to assess their suitability for rendering as final interstitial content.

Fragment scoring engine 200 may use content determination techniques to calculate the relevance and interest of a "candidate" sentence fragment. For example, a different value may be assigned to each metadata item used to generate the sentence fragment. The value may be static, based on the metadata field type (for example, mentioning the genre may be assumed to have a higher value than mentioning the year of production), based on the uniqueness of the metadata value within all programs available (for example, the number of awards won by the program) or based on the popularity of the metadata value within the set of all values (for example, mentioning a popular actor). A specific template 112 may have an interest value associated with it, indicating to fragment scoring engine 200 which scripts (i.e. those generated from templates 112) may be more interesting from a human perspective.

Fragment scoring engine 200 may also be configured to recognize the relative significance of TV and movie specific semantics such as, for example, the importance of highlighting actors vis-à-vis vocal talent (e.g. in mixed live-action animation), or the selection of particular important factors based on the genre of the content. Similarly, fragment scoring engine 200 may also employ weighting profiles to reflect the specific requirements of a broadcast channel or scheduling and/or other usage characteristics. Fragment scoring engine 200 may also consider the popularity, uniqueness and correlation attributes of the program metadata utilized in the script templates under consideration.

It will be appreciated that the scores received from fragment scoring engine 200 may be weighted with a random factor in order to provide a measure of variety in the final interstitial content. Otherwise the sentence fragments with the highest scores may always be used and the viewing audience may repeatedly view the same style of interstitial announcement.

In accordance with an embodiment of the present invention, a variety of templates 112 may be used for interstitials over a defined period of time (e.g. one day, two days, a week or a month) to ensure that the viewer's experience is as natural as possible. Accordingly, the selection process of the most appropriate templates 112 for a particular program may consider whether identical and/or similar templates 112 may have been recently used to introduce other programs on that channel. System 10 may therefore pre-calculate the interstitials for an entire period of schedule to attempt to generate the most relevant and consistently interesting set of interstitials for events in that period.

Rendering manager 300 may select (step 550) candidate sentence fragments for rendering. Rendering manager 300 may comprise grammar validation module 320, speech engine 310 and prosody & emotional control module 330. Grammar validation module 310 may validate (step 560) the grammar of the selected candidate sentence fragments, identifying when a particular metadata substitutions might cause grammatical issues and rejecting sentence fragments that are therefore unsuitable.

It will be appreciated that system 10 may support multiple languages to allow the same sequence of programs to have a custom set of interstitials suitable for the viewers of the content. Each template 112 may be specifically defined with alternatives for each language as may be required. The metadata may also be translated as appropriate (e.g. conversion of genres and advisories).

Grammar validation module 310 may therefore be configured to be aware of syntax variations influenced by inserted metadata 116 such as grammatical gender in languages such as French and German. This may involve understanding the gender of actors as well as the gender of data such as genre (which may vary based on the name of the genre). Regional variations such as the use of "season", "series", "movie" or "film" may also be supported either through use of separate templates 112 and/or standard internationalization mechanisms. Other regional variations may include the relevance of certain metadata to a region, such as the relevance of a particular award to a region (e.g. Daytime Emmy in US verses National Television Awards in UK). Also, variations on parental rating guidance (R in US, 18 in UK) will be catered for in the regional translation.

Prosody & emotional control module 330 may add (step 570) prosody and emotional control details to modify a sentence fragment in light of such relative importance. The sentence may be marked up with appropriate emphasis points to provide a more natural sounding interstitial. The original template 112 may have emphasis, intonation, pace and other prosody specified for the static and dynamic parts of the script. The relevancy/interest score of a sentence fragment's inserted metadata 116 may also be used to emphasise the key parts of the script.

Speech engine 310 may render (step 580) a voice-over script based for each selected sentence fragment. It will be appreciated that the functionality of speech engine 310 may be provided by any suitable text to voice engine such as is known in the art.

System 10 may also comprise review interface 350. Review interface 350 may be used to facilitate manual review of the processes performed by rendering manager 300. The results produced by speech engine 310 and modules 320 and 330 may be reviewed (step 599) via review interface 350. If necessary, review interface 350 may also facilitate modification of these results and reinitiate processing of steps 550-580 as necessary.

Asset mixer 400 may mix a rendered audio version with video and branding assets to generate a final video for use. The video may be a channel branding clip of a particular duration, video that can be looped, static images, background audio and other assets that may be stored in pre-rendered assets database 410. This may be a standard set of assets used for the channel, assets for use at a particular time of day, assets for a genre, assets specific to the program, or even randomly selected assets. Dynamic elements may also be added to the video rendering that may synchronise to the script, such as the display of text, images, trailer and teaser video related to promoted programs within the script.

The rendered script may be combined as a single audio track attached to the video, with multiple rendered videos for each language or as multiple alternative audio tracks with the same video. The latter may be suitable for systems that support multiple audio tracks and where the associated video is appropriate for use in all languages. The selection of appropriate scripts may allow for calculation of relevancy based on availability of a translated version of the script.

In accordance with an embodiment of the present invention, review interface 350 may also be configured to present an operator with a final video from asset mixer 400, and to provide alternative scripts that may be selected in preference to the rendered version. Should an alternative template 112 be selected, system 10 may learn from the choice made and, over time, adjust the model for selecting the most relevant template 112 accordingly.

In accordance with an embodiment of the present invention, specific overrides may be defined on a per channel basis for the results attribute of value for particular metadata used. This may serve to facilitate more unique customization of the "voice" of a channel brand by putting emphasis on areas of metadata that may be of key importance to its content or audience (for example, preference of filming location for National Geographic® channel or cast member for Biography channel).

System 10 may also be configured to support the ability to specify different models based on a demographic, thereby enabling multiple possible scripts to be generated, each one targeted to a different audience segment. Personalisation of the model may also be possible on a per-viewer basis, where a template 112 may be tailored to generate a program promotion for a specific viewer with a particular preference for certain values of metadata (for example, a favourite genre, preferred set of actors). System 10 may also utilise information from social networks to determine trends amongst the viewer's social graph or from a wider demographic in this process. For example, a viewer's social graph may be analysed to derive preferences from the viewer's relationships with other viewers.

Signals from this data may influence the choice of template 112 or selection of metadata to insert into the template to increase the relevancy to the end user.

Fragment scoring engine 200 may use profile data as an additional weight when determining the scores for sentence fragments. Similarly, profile information may also influence the voice style/accent used, video and other elements for generation of the interstitial. Generation may be on a per-target viewing audience basis. A target viewing audience may be a single user or "viewer", or a grouping of such users into specific profiles. Viewing and other analytical data about users may be used to influence the most appropriate template, e.g. "Having watched 'Titanic' we know you'll love the drama 'Finding Neverland' starring Kate Winslet next on BBC 1".

It will also be appreciated that rendering manager 300 may also take into account the amount of time required to be filled with the interstitial material. Appropriate use of pauses and the speed of speech will be considered as factors of the relevance of the interstitial. The system will also be able to determine that a shorter phrase with appropriate vocalisation may be more suitable than a longer phrase. In accordance with come embodiments of the present invention, fragment scoring engine 200 may be employed to analyze rendered scripts for comparison against desired interstitial length.

Fragment scoring engine 200 may take into account many factors to identify the most appropriate scripts to use; the selection may be dependent on both static and/or dynamic data (including learning data gathered from previous script selections). FIGS. 5, 6A-6C and 7, to which reference is now made, may collectively represent the templates 112 and available content and scheduling metadata that may illustrate the scoring process for an exemplary embodiment of the present invention.

FIG. 5 may represent exemplary program metadata that may be used to fill in templates 112 to generate sentence fragments for an interstitial to introduce the movie "Sense and Sensibility". FIGS. 6A-C may depict nine exemplary templates 112 that may be used by sentence fragment generator 100 to produce candidate sentence fragments for the required interstitial. For each exemplary template 112, there may be one or more associated instantiated scripts 116, each of which may be scored independently as may be required by fragment scoring engine 200. FIG. 7 may represent an exemplary scoring profile for the BBC1 channel, listing the emphasis of particular attributes in calculating the score appropriate for usage on this channel.

It will be appreciated that this profile may be simplified for the ease of description within this example. It will also be appreciated that fragment scoring engine 200 may combine the profile with other relevance factors such as the significance of an actor or an award in the context of this movie and/or in the context of all movies.

Accordingly, before considering the inserted metadata, the scoring for each exemplary template may be:

Template 1: Low (channel)+Medium (release date)+Medium (genre)+High (cast)+High (cast)

Template 2: Low (channel)+High (award)+Medium (genre)

Template 3: High (award)+High (award)+Low (channel)

Template 4: N/A

Template 5: N/A

Template 6: Lowest (broadcast time)+Medium (genre)+High (director)+High (cast)+Medium (cast character)

Template 7: Low (channel)+High (award)+High (actor)

Template 8: Low (movie by director)+Low (broadcast time)+Medium (release date)+Medium (genre)

Template 9: Highest (adaptation)+Medium (actor)+Low (channel)

Assuming a simplistic model that assigned a linear scale to importance and accumulated the importance, Template 1 may be selected with Template 6 having the next highest importance.

However, it will be appreciated that such a simplistic model may not always be suitable as this may tend to automatically promote scripts that utilized many different attributes (leading to a very factually rich but potentially uninteresting script). Fragment scoring engine 200 may employ a more sophisticated model that may apply statistical approaches along with other factors such as sentence length, complexity and damping factors for attribute usage.

For example, when also considering the inserted metadata, the scoring may be adjusted to prefer certain instantiated scripts. For example in Template 1 fragment scoring engine 200 may rank Script 1b above Scripts 1a and 1c as it mentions two actors who combined have won more awards or played more significant roles in the movie.

Fragment scoring engine 200 may also consider scripts generated from Template 6 to be more interesting than Template 1 given the significance of the director and characters being portrayed. This may result in Script 6a being selected over Script 1b.

Alternatively, externally sourced metadata may signal a strong correlation between the movie "Sense and Sensibility" and the movie "Brokeback Mountain" which may cause Script 8a to be ranked relatively high despite the otherwise low score for Template 8. Furthermore, fragment scoring engine 200 may rank Script 9a highly because the author may be very well known and the book on which the movie is based may be considered significant amongst all works of fiction.

The final scores may take these various factors into account along with historical information to avoid repeating the same template too regularly. For example, once a sentence fragment has been played for a viewing audience at least "X" number of times, fragment scoring engine 200 may decrease its weight to avoid repeated presentation of similar interstitial content to the viewing audience.

Fragment scoring engine 200 may also adjust the weighting by applying learning from audience response to specific template and metadata combinations. It will be appreciated that system 10 may be configured with a viewing response feedback mechanism (not shown) to facilitate the use of a heuristic weight adjustment process by fragment scoring engine 200. System 10 may receive feedback from one or more users' client devices to adapt the scoring process in accordance with actual responses to interstitial content generated by system 10. For example, if scripts mentioning a specific actor appear to be successful, i.e. relatively high numbers of viewers actually watch or record the programs promoted by the scripts, then fragment scoring engine 200 may increase the weight for that specific actor.

In such manner, feedback may also be used to differentiate between different markets and/or to personalize interstitial content on a per-audience basis. It will be appreciated that an audience of individual viewers and/or community of viewers won't necessarily respond to interstitial content in the same way. People do not always share the same personal tastes and preferences. Furthermore, there may be other, not readily apparent, factors at play. For example, if someone has a personal relationship with a specific actor, he/she may be inclined to watch any program in which the actor appears, even if the actor's role is a minor one. Such circumstances may even apply to groups of viewers, for example, the population of the city or town where the actor grew up. If a viewer or group of viewers consistently responds positively to a script featuring a specific piece of metadata, such as the specific actor's name, fragment scoring engine 200 may increase the weight of that instance of metadata in order to increase the effectiveness of the generated interstitial content. Per the example of a preference for a specific actor, in a given script for the relevant audience, fragment scoring engine 200 may assign greater weight to the supporting actor than for the star, even though for other audiences greater weight may be assigned to the starring actor.

It will be appreciated that an audience's preference for a specific actor described hereinabove is exemplary. Similar audience preferences for other metadata instances may be used similarly to adapt the weighting used by fragment scoring engine 200 per feedback received from the viewing audience. For example, positive or negative responses to the inclusion of locales, languages, genres and the like may also be detected via the feedback mechanism and used to adjust the weighting accordingly. Examples of "positive" responses may be viewing or recording of the promoted program. Examples of "negative" responses may be channel changes or turning off the client device.

Accordingly, fragment scoring engine 200 may also take into account demographic and personal information when scoring instantiated scripts. For example, Script 2b may be rated higher than Script 2a in Great Britain as the BAFTA®s are more relevant to British audiences; Script 7b may be rated higher than Script 7a or 7b because the user may have a preference for Hugh Grant movies; and Script 8a may be rated higher than Script 8b because there may have been significant recent interest in Brokeback Mountain (measured from audience figures, social networks, etc.).

It will be appreciated that the specific scoring examples discussed in reference to FIGS. 5, 6A-C and 7 may be for illustrative purposes; as described hereinabove, the present invention may provide support using a variety of factors in the scoring process.

Fragment scoring engine 200 may also leverage historical viewing information to provide a context for the scoring process. For example, if the feedback mechanism indicates that a viewer has previously played an episode from a given program, fragment scoring engine 200 may increase the weight of sentence fragments that indicate the next episode of the program. In such manner, system 10 may support the generation of a series of interdependent instances of interstitial content.

System 10 may also be configured to employ more advanced natural language generation systems which may perform content determination, document structuring, aggregation, lexical choice, sentiment analysis, referring expression generation and/or realization.

It will be appreciated that system 10 may generate interstitials of a sufficient quality such that the entire generation process may be automated, with the goal of reducing the cost of operating a channel while maintaining a natural branded channel experience that may attract and retain viewers. System 10 may be configured to analyse viewer behaviour based on analytics gathered around the play out of the channel, such as whether a viewer may change the channel during the play out of the interstitial. System 10 may also allow for A/B or multi-variate testing in order to find the most the most optimal templates 112 for use for a given channel, particular content types, specific programs, etc.

System 10 may support other usage in addition to the use of generated interstitial material for insertion into linear channels. For example, system 10 may be configured to generate interstitial material for other uses such as, for example, to introduce the playback of a single video (e.g. in VOD and PVR context) or the playback of a playlist of video (e.g. a sequence of items from a PVR or playlist based OTT channels), thereby providing branding, personalisation and enticement with similar effect to interstitials integrated into a traditional linear experience.

System 10 may also be configured to generate a video promo/trailer for content using a combination of video highlights from the content, branding assets from the channel/advertiser/broadcaster, pre-recorded audio and generated audio and video assets from a template script. The pre-recorded video/audio may signal in/out points for insertion of generated audio and video. Alternatively this may be detected using audio/video analysis or individual elements could be provided as segments used in the generation of the final asset.

The video highlights used for the promo may be specifically provided as a traditional "trailer" or determined from a video asset associated with the metadata. In the latter case, video, audio and video metadata analysis may extract a segment or segments from the full video to use. Text-to-speech or subtitle extraction plus scene detection and other video segmentation techniques may be used to determine video segments that may be usable in isolation. Fragment scoring engine 200 may then score appropriate segment(s) using factors such as target duration, sentiment analysis, video and audio excitement and position in video (e.g. before/immediately after opening credits/theme tune).

The generated promo may be used within a linear channel experience and/or played out on demand when a user may be navigating an EPG. This approach may therefore provide a scalable method for creating promotional video across large content libraries.

Optionally, a media asset may have additional metadata associated with it that may define acceptable intro and "outro" timing points within the content. System 10 may generate a voice-over script to be played at some point in the beginning and/or end of a television program as occurs currently on many linear TV channels. The timing point metadata may be used to identify the points at which the generated voice-over script may be played with, or without, additional interstitial video assets. The timing points may be identified manually. Alternatively, video/audio analysis techniques may be employed identify the relevant timing points in the content (e.g. via detection of the credits at the end of content, or a time count at the beginning of the play).

Additional sophistication may be added to the generation of the video to introduce virtual presenters and computer animation to create a fully generated scene. The generated script may include mark-up to influence the creation of the computer generated animation such as selection of background scenes, virtual camera angles, facial expressions and body movements. Script templates may also be used to specify multiple voices relating to different on-screen characters. This may create a virtual host for a channel or group of content that may provide continuity, branding and entertainment for viewers.

Optionally, templates 112 may also be defined to produce text-based metadata for direct insertion into a device's EPG or content navigator, rather than for rendering as a piece of interstitial content per se e.g. the generation of long-form and short-form programme synopses.

It will be appreciated that system 10 may be configured to generate interstitial content at different places in the content delivery chain. For example, system 10 may be configured to provide generation ahead of playback for inclusion in a standard linear video stream or playlist. Alternatively, system 10 may provide generation on demand on the server-side for delivery to client devices. System 10 may also be implemented on a user's client device to provide generation ahead of playback and/or on demand. System 10 may also support a hybrid implementation with partial generation on server and client.

It will similarly be appreciated that the deployment of system 10 may be configurable. For example, as depicted in FIG. 1, system 10 may be implemented as a centralized utility, typically located as part of, or in communication with, a broadcaster's headend. However, the elements of system 10 may also be distributed to facilitate the generation of personalized interstitials such as described hereinabove.

For example, fragment scoring engine 200, rendering manager 300, review interface 350 and/or asset mixer 400 may be implemented as client side functionality, e.g. in a set top box or any other suitable client device capable of providing a user experience with a channel schedule and/or playlist.

Optionally, where at least some functionality may be implemented in client devices, system 10 may also be configured to enable a viewer to personalize the configuration of fragment scoring engine 200. For example, a viewer may configure a personalized fragment scoring engine 200 to add weight to a particular actor or genre.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove.

What is claimed is:

1. A method implemented on a computing device for generating interstitial material for video content, the method comprising:
   generating at least one instantiated script by inserting metadata related to said video content into at least one script template;
   scoring said at least one instantiated script according to a predefined set of weights associated with a profile for a target viewing audience to produce scored scripts, wherein:
      said scoring comprises the usage of at least one of popularity, uniqueness or correlation attributes of program metadata utilized in said script templates being scored,
      said scoring also comprises analyzing social graphs to derive preferences from a viewer's relationships with other viewers,
      said scoring also comprises analyzing said instantiated scripts for comparison against desired interstitial length, and
      said scoring also comprises introducing a random factor to said pre-defined set of weights;
   selecting at least one of said scored scripts to be rendered as said interstitial material, wherein said selecting is according to at least said scoring;
   producing a rendered audio version for each said selected scored script, wherein said producing comprises validating and correcting grammar in said instantiated scripts; and
   inserting said rendered audio version to be broadcast as said interstitial material during advertising breaks of programs broadcast according to a linear broadcast program channel schedule or playlist of said programs, wherein said interstitial material is a promotional interstitial to promote said video content, and said computing device is configured as part of a head-end system.

2. The method according to claim 1 and also comprising: mixing each said rendered audio version with at least one other media asset to produce final interstitial content.

3. The method according to claim 2 wherein said at least one other media asset is at least one video/audio segment from said video content, said video/audio segment selected in accordance with video and metadata analysis in order to produce said final interstitial content.

4. The method according to claim 1 wherein said producing comprises:
   identifying emphasis points in said instantiated scripts.

5. The method according to claim 1 wherein said generating comprises:
   generating different sentence structures based on language and metadata within versions of said instantiated scripts.

6. The method according to claim 1 wherein said scoring comprises:
   weighting at least one of geographic and demographic preferences, wherein said demographic preferences indicate at least one of gender, age and other sociographic data, and said geographic preferences indicate at least one of national and regional preferences.

7. The method according to claim 1 wherein said scoring comprises:
   weighting viewer preferences, wherein said viewer preferences are indicated by at least one of viewing statistics or individual viewer profiles.

8. The method according to claim 1 wherein said scoring comprises:
   using weighting profiles, wherein said weighting profiles address specific requirements of at least one of channels, scheduling or other usage characteristics.

9. The method according to claim 1 and also comprising:
   receiving indications of positive/negative responses to said interstitial material from said target viewing audience; and
   adjusting said set of weights in accordance with said indications.

10. The method according to claim 1 wherein said interstitial content is generated as a series of interdependent instances of interstitial content.

11. The method according to claim 10 and also comprising:
    tracking a history of said interstitial content generated for said target viewing audience; and
    adjusting said set of weights in accordance with said history.

12. The method according to claim 1 wherein at least one of said generating, scoring, selecting or producing is performed by a client device receiving said video content from said head-end system.

13. The method according to claim 1 wherein said generating comprises: indicating a time during said video content for a rendered audio version to be played, wherein said indicated time is determined in accordance with at least one of said metadata and analysis of the audio and/or video in said video content.

14. The method according to claim 1 and also comprising enabling manual review and correction of the results of said generating, scoring, rendering and producing.

15. The method according to claim 1 wherein said scoring comprises: introducing weights based on statistical distributions and template usage history to provide variety in said selecting in order to maximize audience engagement.

16. The method according to claim 14 and also comprising improving said scoring in accordance with analysis of at least one of said manual correction of results or viewer response to said interstitial material.

17. The method according to claim 1 wherein said metadata is at least one of program, program availability, scheduling or externally sourced metadata.

18. The method according to claim 1 wherein said metadata is associated with a multiplicity of programs.

19. The method according to claim 1 wherein said generated scripts are used to form text output.

20. A video content interstitial material generation system instantiated on a tangible medium on a computing device and comprising:
   a script template database operative to store script templates for promotional interstitials to promote viewing of media assets;
   at least one metadata database operative to store metadata associated with said media assets;
   a sentence fragment generator operative to generate instantiated scripts for said media assets by at least inserting said associated metadata into at least one of said script templates;
   a sentence fragment scoring engine operative to produce scored scripts by scoring each of said instantiated scripts according to a predefined set of weights, wherein said set of weights is associated with a profile for a target viewing audience, wherein said scoring also comprises analyzing social graphs to derive preferences from a viewer's relationships with other viewers;
   a grammar validation module operative to validate and correct grammar for selected said scored scripts;
   a rendering manager operative to produce a rendered audio version for said selected scored scripts, wherein said scored scripts are selected for rendering at least based on scores assigned by said sentence fragment scoring engine; and
   a broadcast program schedule comprising a linear broadcast program channel schedule for broadcasting said media assets with said rendered audio version inserted for broadcast during advertising breaks of said media assets, wherein said computing device is configured as part of a head-end system.

21. The system according to claim 20 and also comprising:
   an asset mixer operative to mix said rendered audio version with other media assets to produce final interstitial content.

22. The system according to claim 20 and also comprising a review interface operative to enable manual review and control of the operation of said system.

23. The system according to claim 20 and also comprising means to improve the operation of said sentence fragment scoring engine in accordance with analysis of at least one of manual corrections based on manual review and viewer response to said interstitial material.

24. The system according to claim 20 and also comprising a prosody & emotional control module operative to modify said scored scripts to reflect relative importance as indicated by said associated metadata and said script template.

25. The system according to claim 20 wherein said metadata is at least one of program, program availability, scheduling or externally sourced metadata.

26. The system according to any of claim 20 wherein said metadata is associated with a multiplicity of programs.

27. The system according to claim 20 wherein said generated scripts are used to form text output.

28. The system according to claim 20 and also comprising:
   means for receiving indications of positive/negative responses to said interstitial material from said target viewing audience; and
   means for adjusting said set of weights in accordance with said indications.

29. The system according to claim 20 wherein said interstitial content is generated as a series of interdependent instances of interstitial content.

30. The system according to claim 20 and also comprising:
   means for tracking a history of said interstitial content for said target viewing audience; and
   means for adjusting said set of weights in accordance with said history.

* * * * *